UNITED STATES PATENT OFFICE.

GEORGE THOMPSON, OF EAST TARENTUM, PENNSYLVANIA.

IMPROVEMENT IN BOXES FOR PRESERVING ALKALIES.

Specification forming part of Letters Patent No. 18,214, dated September 15, 1857.

*To all whom it may concern:*

Be it known that I, GEORGE THOMPSON, of East Tarentum, in the county of Allegheny and State of Pennsylvania, have invented a new and useful Improvement in Air-Tight Packages for Putting up Caustic Soda and Potash; and I do hereby declare the following to be a full, clear, and exact description thereof.

My invention consists in the use of small boxes constructed of sheet-iron or other metal and put together with infusible cement for the purpose of putting up the hydrated alkalies of soda and potassa in small air-tight packages.

The hydrated alkalies of soda and potassa, commonly known as "caustic soda" and "potash," are highly-concentrated alkalies, which, on account of their corrosive qualities and their liability to deliquesce when exposed, even for a short time, to the action of the atmosphere, require to be kept in air-tight packages, and cannot therefore be introduced into general use for domestic purposes unless the packages are so small that their whole contents may be immediately used when they are broken open.

In order to prevent the action of the atmospheric air on these alkalies while they are being put up in their cases or coverings, it is necessary to pour them while so intensely hot as to char a chip or stick plunged into the melted mass into the boxes intended to receive them, which prevents the use of boxes fastened together with solder or other fusible cement.

After trying several plans with more or less success, I have found the following mode of putting up these caustic alkalies to be attended with complete success:

I construct small cylindrical boxes of very thin sheet-iron. These cylinders are connected down the side by a lapped joint, which is pressed firmly together by machinery. The top and bottom of these boxes are made of a circular disk of similar material of proper diameter, the edge of which is turned up by machinery. The bottom is fastened onto the cylinder by laying some infusible cement made by moistening fire-clay with linseed-oil around the inside of the turned-up edge of the bottom piece and then pressing the cylindrical body of the box into it. When the cement around the bottom is sufficiently dry the caustic soda or potash is poured from a ladle into these boxes, a number of which are placed together to be filled at the same time. The boxes must be filled quite full, so as to leave no cavity for air when the lid is put on. This top piece or lid is constructed similarly to the bottom piece, and, like it, is furnished with cement around the inside of the turned-up edge, and when the box is filled, and while the contents are yet red hot, it is forced down over the box. When thus closed the box is dried in an oven or kiln, and, finally, when the cement is sufficiently dry, the whole box is dipped into a pot of varnish, which insures the perfect sealing of the box and exclusion of all atmospheric air. The boxes thus prepared and filled may be kept any length of time, but when opened the contents must be immediately used or it will deliquesce and become worthless.

These alkalies thus put up in small quantities are highly useful for domestic purposes, whereas as ordinarily put up in large packages they are inaccessible to the public, as they cannot be retailed in small quantities, unless thus put up when manufactured, as to open a large package is to destroy and render useless its entire contents.

What I claim as my invention, and desire to secure by Letters Patent, is—

The use of metallic boxes, constructed as described, and united with infusible cement, for the purpose of putting up the caustic alkalies of soda and potassa in small quantities, as described.

In testimony whereof I have hereunto set my hand this 18th day July, A. D. 1857.

GEORGE THOMPSON.

Witnesses:
MARTIN G. CUSHING,
L. P. STONE.